WEB SUPPLYING AND REPLACING APPARATUS

Filed May 18, 1960 8 Sheets-Sheet 1

INVENTORS.
WILLIAM HUDSON GILES
ANTON RICHARD FRANK
BY
Luther W. Hawley
ATTORNEY INVENTORS.
WILLIAM HUDSON GILES
ANTON RICHARD FRANK
BY
Luther W. Hawley
ATTORNEY INVENTORS.
WILLIAM HUDSON GILES
ANTON RICHARD FRANK
BY Luther W Hawley
ATTORNEY

WEB SUPPLYING AND REPLACING APPARATUS

Filed May 18, 1960 8 Sheets-Sheet 4

INVENTORS.
WILLIAM HUDSON GILES
ANTON RICHARD FRANK
BY
Luther W. Hawley
ATTORNEY

WEB SUPPLYING AND REPLACING APPARATUS

Filed May 18, 1960 8 Sheets-Sheet 5

INVENTORS.
WILLIAM HUDSON GILES
ANTON RICHARD FRANK
BY
Luther W. Hawley
ATTORNEY Jan. 8, 1963 W. H. GILES ETAL 3,072,354

WEB SUPPLYING AND REPLACING APPARATUS

Filed May 18, 1960 8 Sheets-Sheet 6

INVENTORS.
WILLIAM HUDSON GILES
ANTON RICHARD FRANK

BY Luther W Hawley

ATTORNEY

Jan. 8, 1963 W. H. GILES ETAL 3,072,354

WEB SUPPLYING AND REPLACING APPARATUS

Filed May 18, 1960 8 Sheets-Sheet 7

INVENTORS.
WILLIAM HUDSON GILES
ANTON RICHARD FRANK
BY
Luther W. Hawley
ATTORNEY Jan. 8, 1963 W. H. GILES ETAL 3,072,354

WEB SUPPLYING AND REPLACING APPARATUS

Filed May 18, 1960 8 Sheets-Sheet 8

INVENTORS.
WILLIAM HUDSON GILES
ANTON RICHARD FRANK
BY

ATTORNEY

United States Patent Office 3,072,354

Patented Jan. 8, 1963

3,072,354

WEB SUPPLYING AND REPLACING APPARATUS

William H. Giles, Brooklyn, and Anton Richard Frank, Jamaica, N.Y., assignors to Nu Roll Corp., Brooklyn, N.Y., a corporation of New York Filed May 18, 1960, Ser. No. 29,918
19 Claims. (Cl. 242—58.4)

This invention relates to web splicing or web supplying or replacing apparatus or mechanism for automatically supplying or replacing the leading end of one roll of webbing to supply or replace the end of an exhausted or diminishing web supply. The invention can be used for a web of paper for any desired purpose and one such instance is for supplying a web to a wrapping machine.

The invention further relates to a method of replacing an exhausted web supply with a reserve web supply so worked out that the web from both sources can be fed to the main web feed and the trailing end of the exhausted web will set in operation the feed for the reserve web.

The invention has for its salient object to provide mechanism so constructed and arranged that a web from a reserve supply roll will be supplied to replace the trailing end of a diminishing or exhausted web supply without interruption of the operation of the machine on which the web supply rolls are mounted.

Another object of the invention is to provide mechanism so constructed and arranged that a web from a reserve supply roll will be accurately positioned and fed in such a manner as to mate with or match the end of the web being exhausted in order to continue without interruption any printed matter on the two webs.

Another object of the invention is to provide web splicing mechanism for splicing two webs together having means engaging the diminishing or exhausted web for automatically setting in operation the feed of the new or reserve web as soon as the diminishing web is exhausted.

Further objects of the invention will appear from the following specification taken in connection with the drawings which form a part of this application, and in which FIG. 1 is a side elevation of mechanism constructed in accordance with the invention;

In the particular embodiment of the invention illustrated in FIGS. 1 to 16 inclusive, the splicing mechanism is mounted in a frame having a base 25, end members 26, and side frame members 27 and 28.

Figure 1:
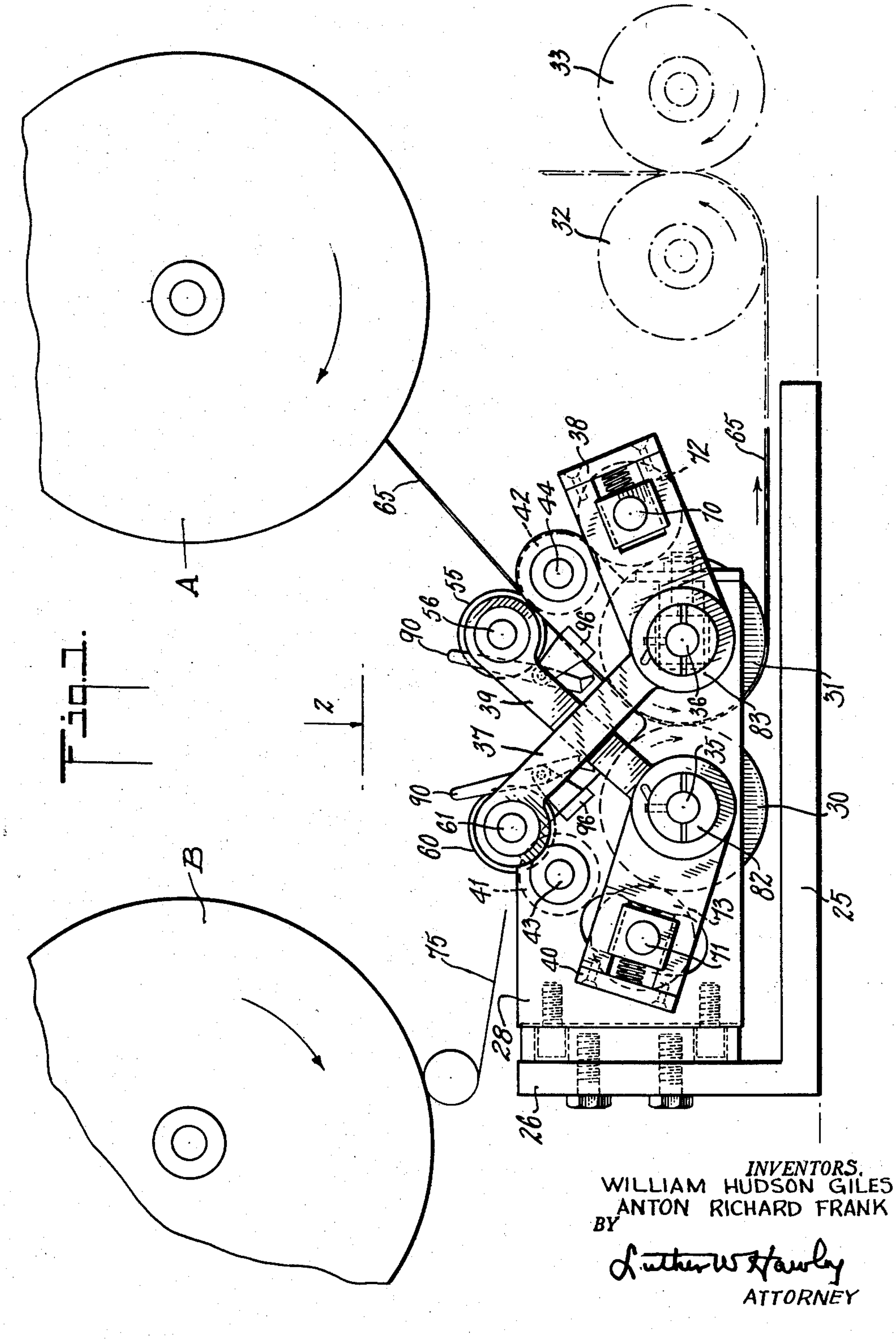

The supply rolls for the webs are designated A and B in FIG. 1 and the web from supply roll A is being fed between a pair of feed rolls 30 and 31 to a pair of driven feed rolls 32 and 33. From the rolls 32 and 33 the web will be led to the machine on which it will be put to its desired use, such as to a wrapping machine. The feed rolls 30 and 31 are not positively driven but are driven by contact with the web as it is fed through the feed rolls 32 and 33.

The rolls 30 and 31 are mounted on spindles 35 and 36, suitably journaled in the frame, and the spindle 36 has pivoted thereon a pair of bellcrank levers comprising arms 37 and 38. The spindle 35 has pivoted thereon a pair of bellcrank levers comprising arms 39 and 40. A pair of idler rolls 41 and 42 are mounted on spindles 43 and 44 carried by the frame. The rolls 41 and 42 are interrupted or recessed, as shown at 50, 50 and 51, 51. Opposite the recessed portions 50, 50 are disposed a pair of narrow rolls 55, 55 carried by a spindle 56 which is mounted in the outer ends of the arms 39, 39 of one of the bellcrank levers. Similarly, a pair of narrow rolls 60, 60 are mounted on a spindle 61 carried by the arms 37, 37 of the other pair of bellcrank levers.

The web 65 from the supply roll A is led over the roll 42 and is engaged by the rolls 55 carried by the spindle 56, which is mounted in the bellcrank lever arm 39. As long as the web 65 continues to be fed and is not exhausted, the rolls 55 will hold the bellcrank lever comprising the arms 39 and 40 in the position shown in FIGS. 1, 3 and 4. However, when the web 65 from the supply roll A is exhausted, the rolls 55 will drop into the recesses 50, as shown in FIG. 5, and the bellcrank lever comprising the arms 39 and 40 will be tilted, as shown in FIG. 5.

The bellcrank lever arms 38 and 40 have mounted therein spindles 70 and 71, on which are mounted rolls 72 and 73 which are in contact with the feed rolls 30 and 31 and are rotated thereby.

Figure 3:
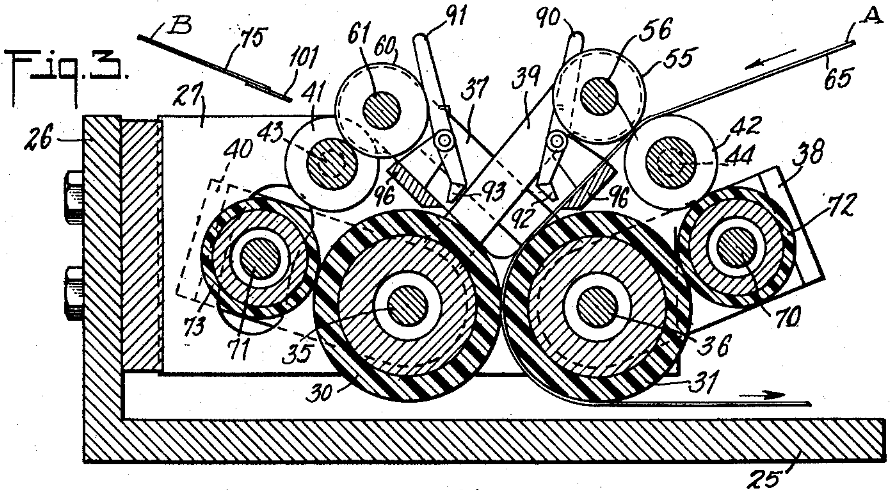
FIG. 3 is a sectional elevation taken substantially on line 3—3 of FIG. 2, looking in the direction of the arrows, and showing the splicing mechanism in the position taken before the diminishing web has been exhausted.

In FIG. 3 it will be noted that the drive is communicated from the roll 31 through the roll 72 to the roll 42. However, when the web 65 from the supply roll A is exhausted, the rolls 55 will drop into the recesses 50, as shown in FIG. 5, thus permitting the bellcrank lever comprising arms 39 and 40 to tilt, moving the roll 73 into contact with the roll 41, thus starting the drive of the reserve web 75 from the reserve supply roll B. When the reserve web feeds between rolls 60 and 41 bellcrank lever 37, 38 is tilted and roll 72 moves away from roll 42.

Coil springs 80 and 81 are mounted on spindles 35 and 36 and are adjusted to proper torsion by connections to adjustable collars 82 and 83 which are pinned or adjustably fixed to the spindles 35 and 36. The other ends of the springs engage the arms 39 and 37 and tend to swing arm 39 in a clockwise direction and arm 37 in an anti-clockwise direction, viewing FIGS. 1, 3, 4 and 5. Thus, the rolls 55, 55 tend to enter recesses 50, 50 and rolls 60, 60 tend to enter recesses 51, 51 when the webs engaged thereby are exhausted.

It is important for the proper replacement of the exhausted web by a reserve supply web that the advance end of the replacement web be properly positioned so that when it is fed it will register with the web being replaced. This is particularly true when the webs carry printed matter.

To accomplish such registration, there are provided stop levers 90, 90 and 91, 91, pivoted on the frame, to engage and properly position the advance edges of the webs. These levers have extensions 92, 92 and 93, 93 which extend laterally from the lower ends of the levers to positions where they are engageable by ends of the webs.

Figure 4:
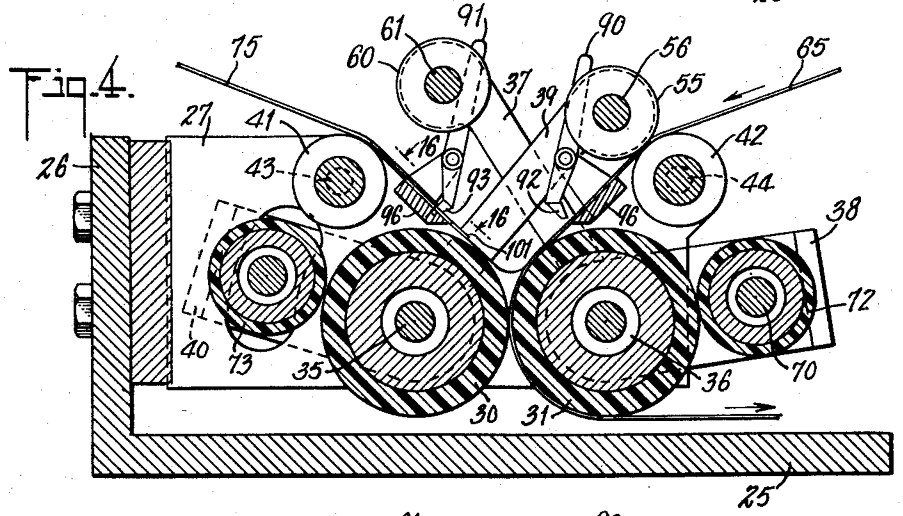
FIG. 4 is a view similar to FIG. 3 but showing the reserve supply web positioned for joining with the trailing end of the diminishing web.
Figure 5:
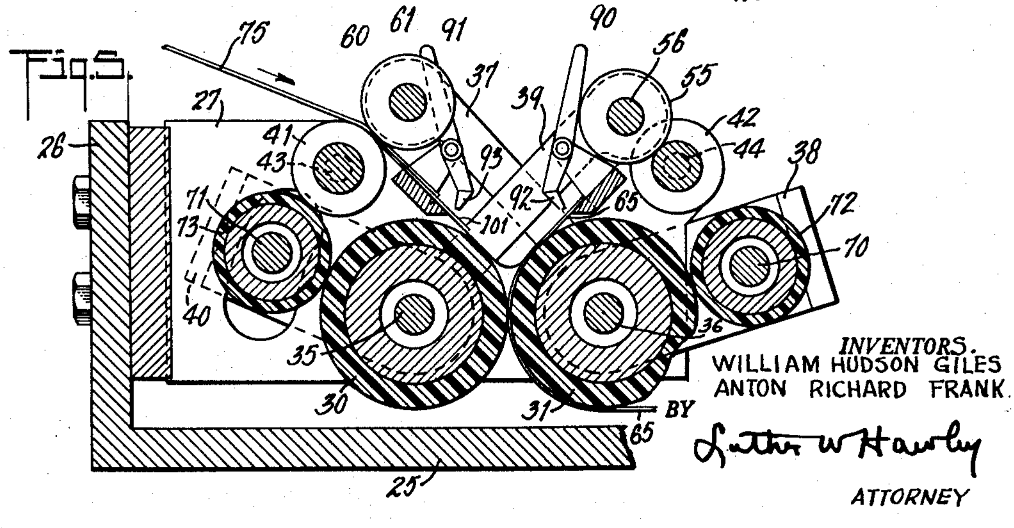
FIG. 5 is a view similar to FIG. 4 but showing the reserve supply web about to be fed forwardly for joining with the trailing end of the diminishing web.

The webs pass over flat supporting bars 96, 96 which are mounted on the frame, and the lower ends of the stop levers or the extensions thereof engage recesses in the bars 96, 96 in the manner shown at the left in FIG. 4 to form stops for positioning the ends of the strips.

The levers 90, 91 are engaged by springs 100 which are so mounted and so engage the levers that they tend to swing the lower ends of the levers away from the bars 96, 96. The levers at the left in FIG. 4 have been swung to operative position by contact between the upper ends of the levers 91 with the spindle 61 carried by the arms 37, 37. Thus, when stops 91 are to be moved to operative position to engage the advance end of the web 75, the spindle 61 is lifted, as shown in FIG. 4.

In the form of the invention illustrated in FIGS. 1 to 16 inclusive, the advance edge of the web 75 has secured thereto an adhesive strip 101 in the manner shown in FIGS. 4, 5, 8, 9, etc. When the web 65 from the roll A is exhausted, the rolls 55 will drop into the recesses 50, thus permitting the bellcrank levers 39, 40 to swing in a clockwise direction, raising the roll 73 into engagement with the roll 41 and starting the feed of the web 75.

Figure 6:
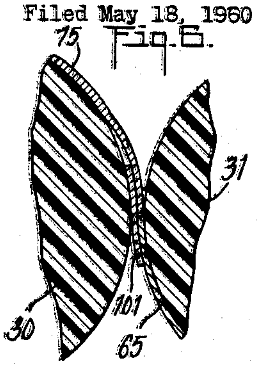
FIG. 6 is an enlarged sectional elevation showing the reserve supply web joined to the end of the diminishing supply web and being fed between a pair of feeding rolls.
Figure 7:
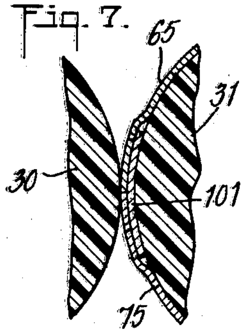
FIG. 7 is a view similar to FIG. 6 but showing the joined ends of the two webs when the reserve supply comes from the right instead of from the left, viewing FIGS. 6 and 7.
Figure 8:
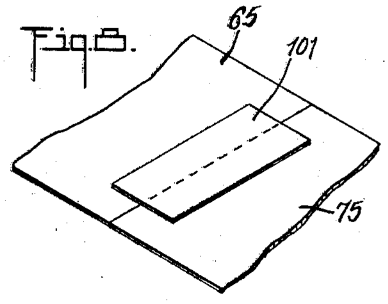
FIG. 8 is a perspective plan view showing the two ends of the web joined together, as shown in FIG. 7.
Figure 16:
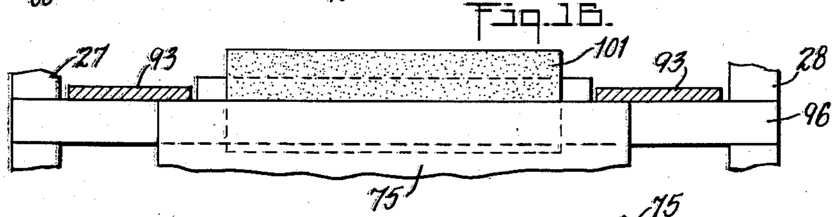
FIG. 16 is a detail plan view showing the stop means engaging the end of the web to position the web properly for feeding and joining to the trailing end of the diminishing web.

FIG. 6 illustrates the passage of the advance edge of web 75 into contact with the trailing end of the web 65 between the feed rolls 30 and 31, in which position the adhesive strip 101 splices the two ends of the webs together. FIG. 7 illustrates the splicing of the trailing end of the web 75 to the advance end of the web 65. It will be noted that the adhesive strip 101 in FIG. 6 engages the underside of the trailing end of the web 65. However, in FIG. 7, the adhesive strip 101 carried by the advance end of the web 65 is positioned beneath the trailing end of the web 75.

Figure 9:
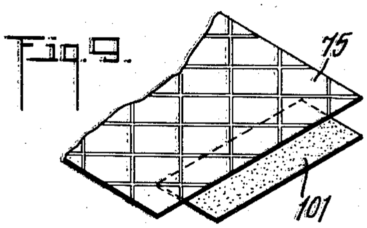
FIG. 9 is a perspective view showing one of the webs with an adhesive tape secured to the end thereof and pre-cut to match the end of the web to which it is to be joined.
Figure 10:
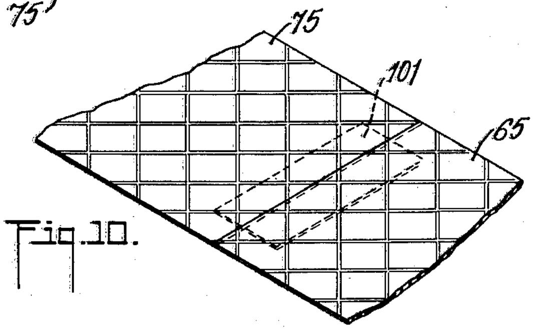
FIG. 10 is a perspective view illustrating the two matched ends joined together by the tape.
Figure 11:
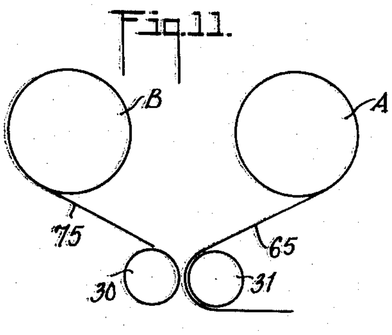
FIG. 11 is a diagrammatic elevational view showing the two webs in position to be joined.
Figure 12:
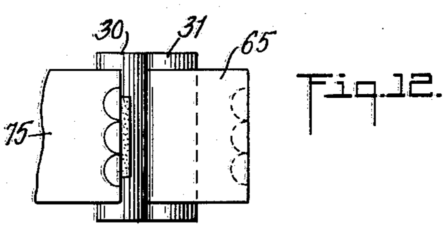
FIG. 12 is a plan view showing webs from the two rolls pre-cut in order to match when joined.
Figure 13:
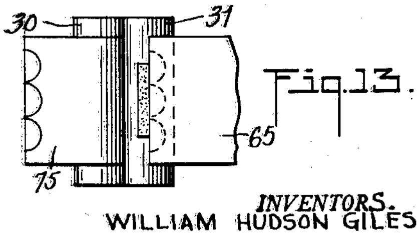
FIG. 13 is a view illustrating the manner in which the matched ends of the webs are joined when the new roll is on the right instead of on the left, as shown in FIG. 12.
Figures 14, 15:
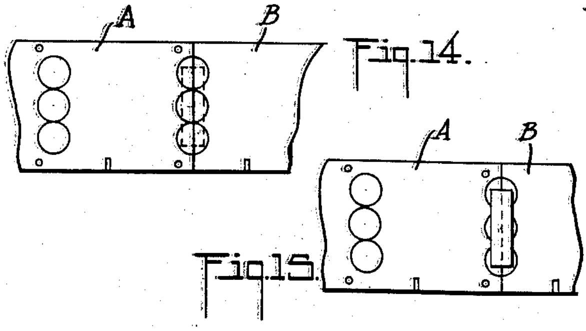
FIG. 14 is a plan view showing the matched ends of the webs illustrated in FIG. 12 after they have been joined.
FIG. 15 is a plan view of the matched ends of the web shown in FIG. 13 after they have been joined.

FIGS. 9 and 10 show designs on the webs for the purpose of illustrating the accuracy with which the ends of the webs are joined without interrupting the designs or printed matter on the webs. This accuracy is also illustrated diagrammatically in FIGS. 11 to 14 inclusive. In FIG. 12 the splicing strip is disposed beneath the advance end of the replacement strip and FIG. 14 shows the two webs joined together, illustrating the accuracy in matching designs. In FIG. 14 the splicing strip is disposed beneath the two webs, and in FIG. 15 the splicing strip is disposed on the top of the two webs.

In FIGS. 1 to 16 inclusive the two webs are joined by means of an adhesive splicing strip and the foregoing description outlines clearly how the webs are properly positioned and it will be clear that the junction of the webs by the splicing strip will be carried out without interrupting the operation of the machine.

The method of splicing webs by the use of the apparatus enables the user to splice webs accurately with the printed matter thereon in registration.

In this connection, attention is directed to the description on page 6, lines 9 to 30, and page 7, lines 1 to 32.

While the web from one supply roll is running through, as web 65 in FIG. 4, the operator lifts lever 37 and properly positions the leading edge of the web 75, a tape 101 having been secured to this edge. The edge is set by the stop 93. The distance from the feed rolls 41 and 60 to the squeeze point between the main feed rolls 30 and 31 is constant and can be accurately determined and the linear speed of the web material being pulled or fed into the apparatus is also constant.

When the end of the expiring web passes beneath the trigger roll 55 and permits this roll to lower, as shown in FIG. 5, and swings arm 40 and roll 73 into driving contact with roll 43, the feeding of the web 75 will be started. Therefore, if the movement of the trigger roll takes .05 second and the material moves 20" a second, then the new edge of web 75 must travel one inch to insure a butt splice.

To accurately control a lap splice, the advance end of web 75 will be set farther forward.

In the embodiment of the invention illustrated in FIGS. 17 to 20 inclusive, there are shown two rolls C and D, the roll C being connected to the feed rolls to supply the web, and the roll D being a reserve supply roll. The web is fed to the machine on which it is to be used, such as a packaging machine, by a pair of feed rolls 110 and 111, the roll 111 being mounted on a shaft 112 which is driven from a suitable source of power, preferably from the machine on which the web is to be used, by a chain 113. The shaft 112 has secured thereto a sprocket 114 which, through a chain 115, drives a sprocket 116 on a spindle 117 on which is mounted a feed roll 118. The roll 118 coacts with a roll 119 mounted on a spindle 120. Thus, the feed roll 118 is driven at the same speed as the feed roll 111 and its coacting roll 110.

As in the preceding form of the invention, there are two sets of bellcrank levers mounted on the spindles 117 and 120. The levers mounted on the spindle 120 have arms 121 and 122 and the levers mounted on the spindle 117 have arms 123 and 124.

The arm 122 has mounted thereon a roll 125 which drives a roll 126 mounted on a spindle 127 carried by the frame of the machine. The roll 126 is provided with recessed portions similar to the portions 50, 50 and 51, 51 shown in FIG. 2.

Figure 2:
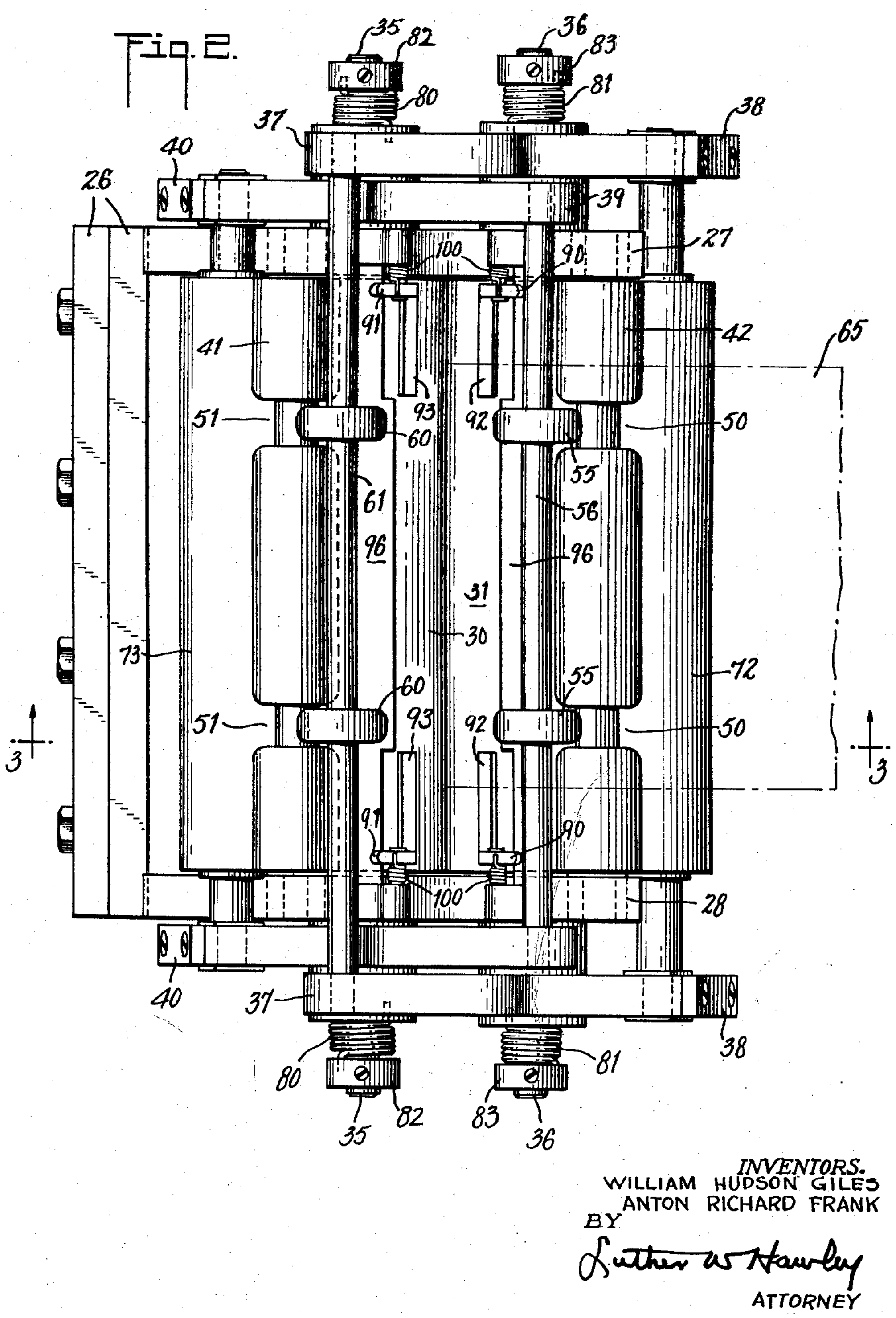
FIG. 2 is a top plan view of the splicing mechanism shown in FIG. 1.

The arms 123 have mounted thereon a spindle 130 carrying rolls 131 similar to the rolls 55, 55 and 60, 60 shown in FIG. 2. The rolls 131 rest on the web 135 from the supply roll C and the arms 123 are held in the position shown in FIG. 17 by springs 136. When web 135 is exhausted, the rolls 131 drop into the recesses in the roll 126 in the manner shown at the left in FIG. 17. The arms 121 have mounted therein a spindle 140, on which are mounted rolls 141 similar to the rolls 131 which normally rest on the web when the web is being fed, as shown at the right in FIG. 17. When the web is exhausted, these rolls 141 drop into recesses in a roll 142 carried by a spindle 143 mounted in the frame. The roll 142 is adapted to engage a roll 144 mounted on a spindle 145 carried by the arms 124 in the manner similar to the engagement between the roll 125 and roll 119.

Figures 17, 18, 19, 20:
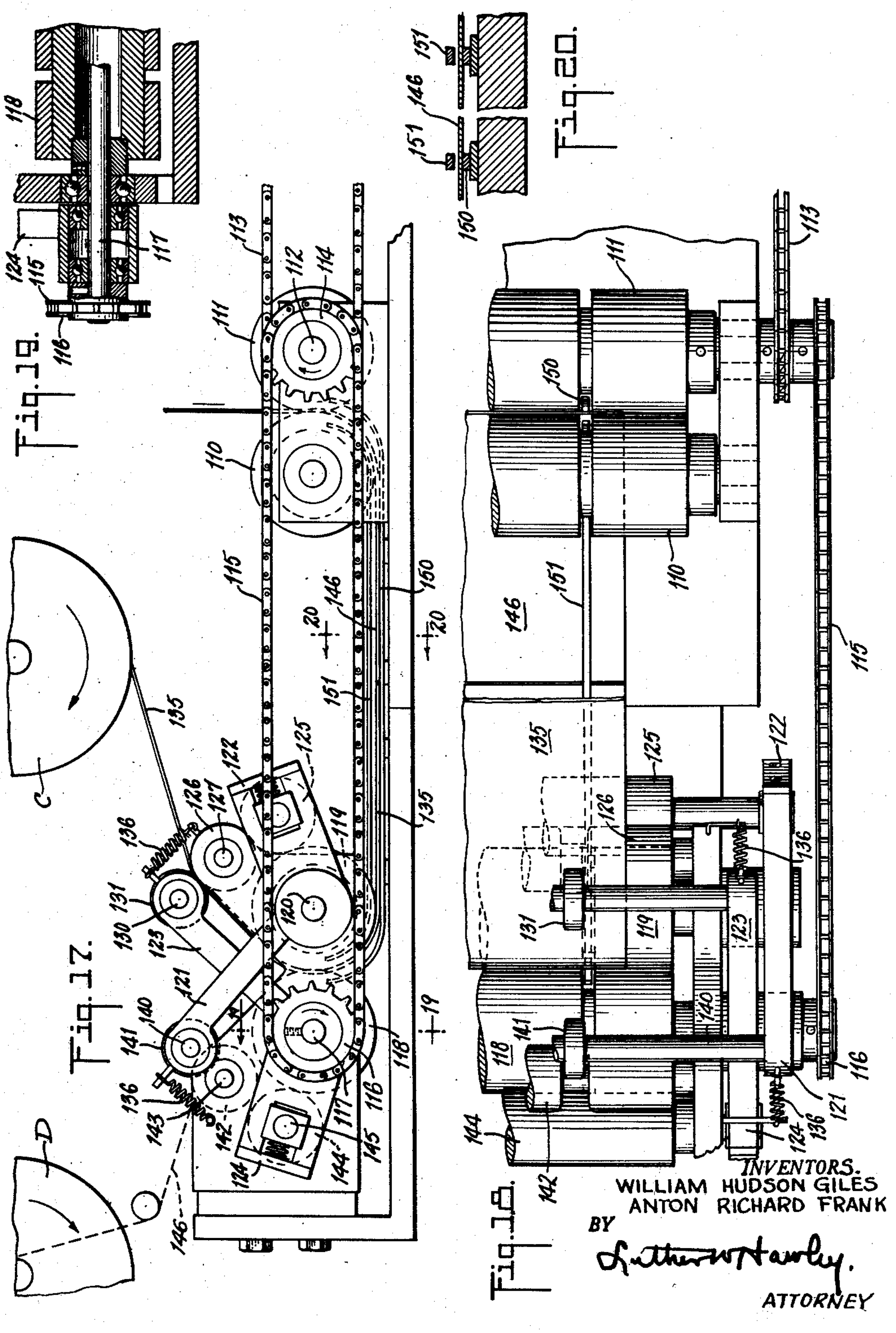
FIG. 17 is a side elevational view illustrating a modified form of construction in which the end of the reserve supply web is fed into abutting relation to the end of the diminishing or exhausted web but is not joined thereto.
FIG. 18 is a plan view, partly broken away, illustrating the mechanism shown in FIG. 17.
FIG. 19 is a detail sectional elevation taken substantially on line 19—19 of FIG. 17, looking in the direction of the arrows.
FIG. 20 is a sectional detail elevation taken substantially on line 20—20 of FIG. 17, looking in the direction of the arrows.

The web 135 or the web 146 from the reserve roll D passes between the feed rolls 118 and 119 and between guide strips 150 and 151, it being understood that several sets of these guide strips will be provided across the lengths of the rolls, the rolls being recessed as shown in FIG. 18 to accommodate the guide strips. These strips extend from the rolls 118 and 119 to the rolls 110 and 111 and guide the webs until they are delivered to the machine in which they are to be used by the feed rolls 110 and 111.

In the form of the invention illustrated in FIGS. 17 to 20 inclusive, the webs are not spliced together but are delivered in abutting relation, as shown in FIG. 17. The proper positioning of the webs can be readily accomplished due to the fact that the rolls 118 and 119 are driven at the same speed as the delivery rolls 110 and 111 and this drive is also synchronized with the operation of the machine on which the webs are to be used.

It will be understood that the bellcrank levers and rolls 131 and 141 operate the same in this machine as in the machine illustrated in FIGS. 1 to 16 inclusive and above described.

In the form of the invention illustrated in FIGS. 21 to 24 inclusive, the frame 160 has mounted therein feed rolls 161 and 162 which feed the web to a pair of feed rolls 163 and 164 by which the web is fed to the machine on which it is to be used. The rolls 163 and 164 are positively driven from a suitable source of power and the roll 161 is driven from the shaft 165 of the roll 163 by a sprocket and chain connection 166, 167 and 168.

The supply rolls from which the webs are fed to the rolls 161 and 162 are not illustrated. A set of feeding or lead in mechanism is provided for each web from the two supply rolls, not shown. At the right in FIG. 21 there is shown a lever 170 which is pivotally mounted on shaft 171 of the feed roll 162. The lever 170 has mounted thereon a spindle 172 which carries an idler roll 173, which is adapted to engage a lead in roll 174 which coacts with a roll 175 to lead the web from the supply roll at the right to the feed rolls 161 and 162. The roll 175 is mounted on a spindle 176, which in turn is mounted on a frame 180 carried by a bracket 181 pivoted at 182 to a portion of the frame 160. The frame 180 has a handle 184 and can be lifted to facilitate threading the web between the rolls 174 and 175. The roll 175 comprises a plurality of spaced rollers 185. Latches 177 and 177′ are provided to hold the rolls 175 and 175′ in operative position.

Two sets of lead in rollers are provided, one for each web, and two identical control mechanisms are also provided for bringing one set of lead in rollers into driving connection with the rolls 161 and 162 through rolls 173 and 173′ when the web from the other supply roll is approaching exhaustion.

Figures 21, 24:
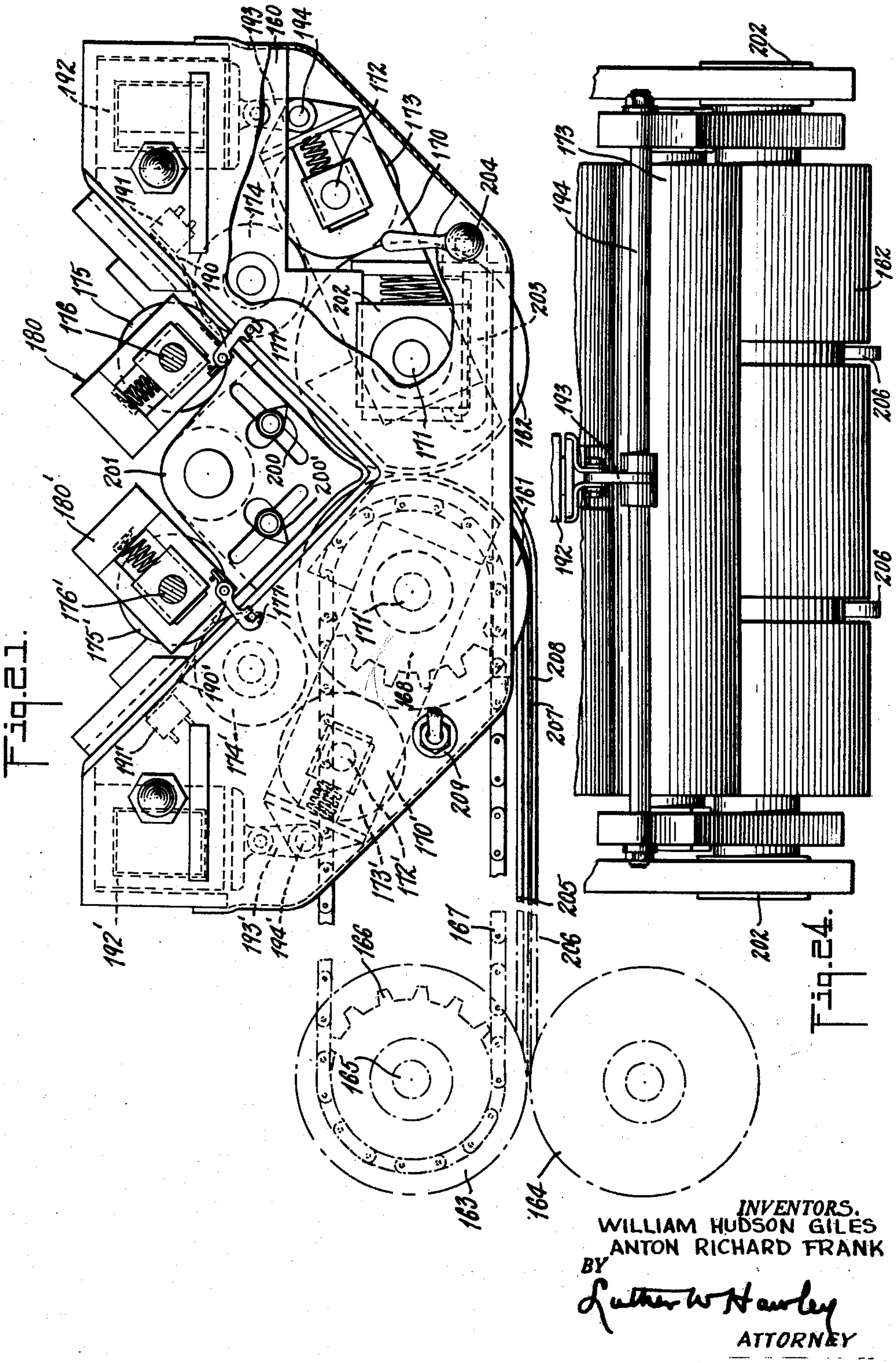
FIG. 21 is an end elevation, partly in section, of a further modification of the invention in which the driving connections for the lead in rolls are actuated and controlled by solenoids.
FIG. 24 is a detail elevational view showing particularly the linkage connection between the solenoid and the levers on which are mounted the rolls adapted to connect the feed rolls to the lead in rolls.
Figure 22:
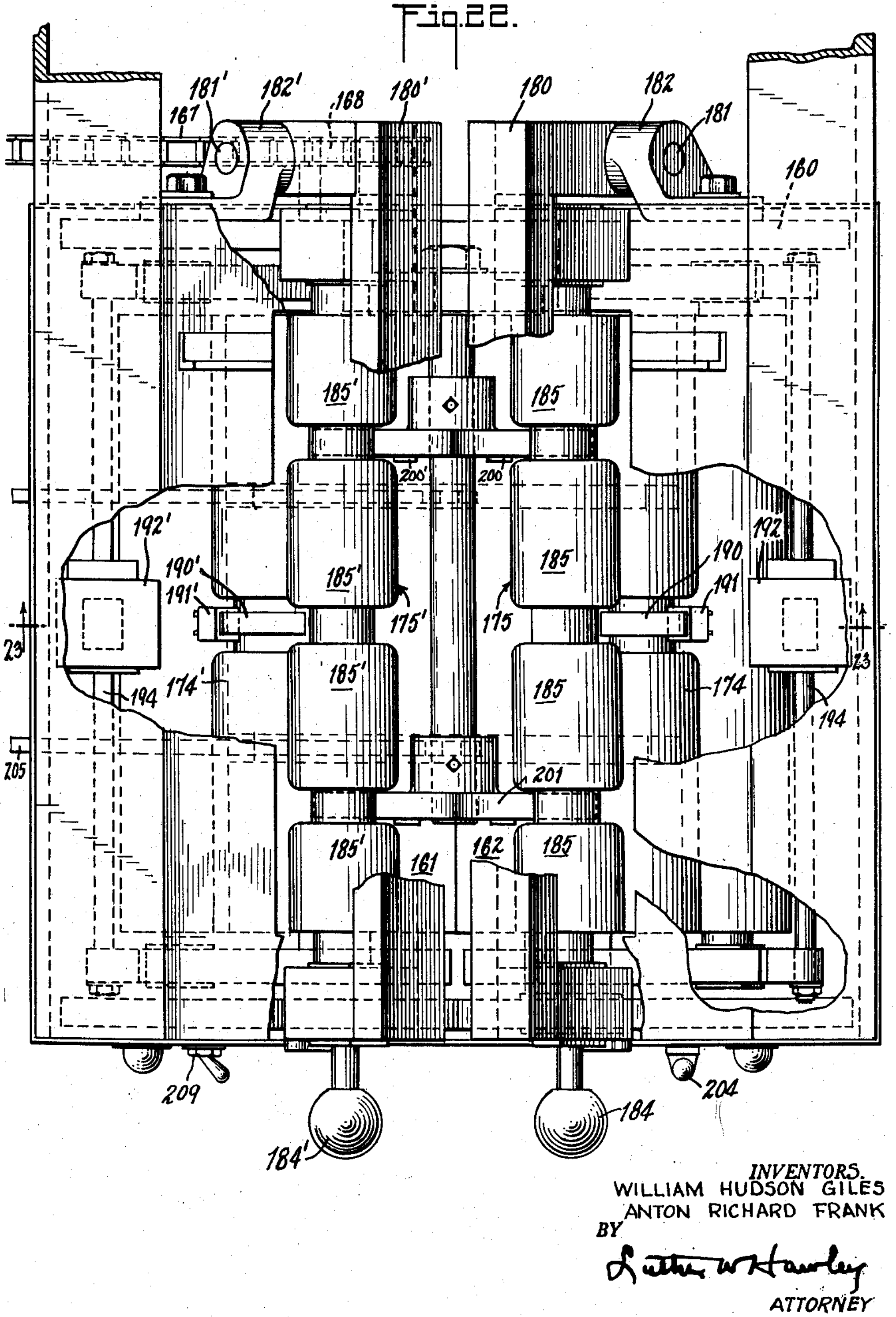
FIG. 22 is a plan view of the structure shown in FIG. 21.
Figure 23:
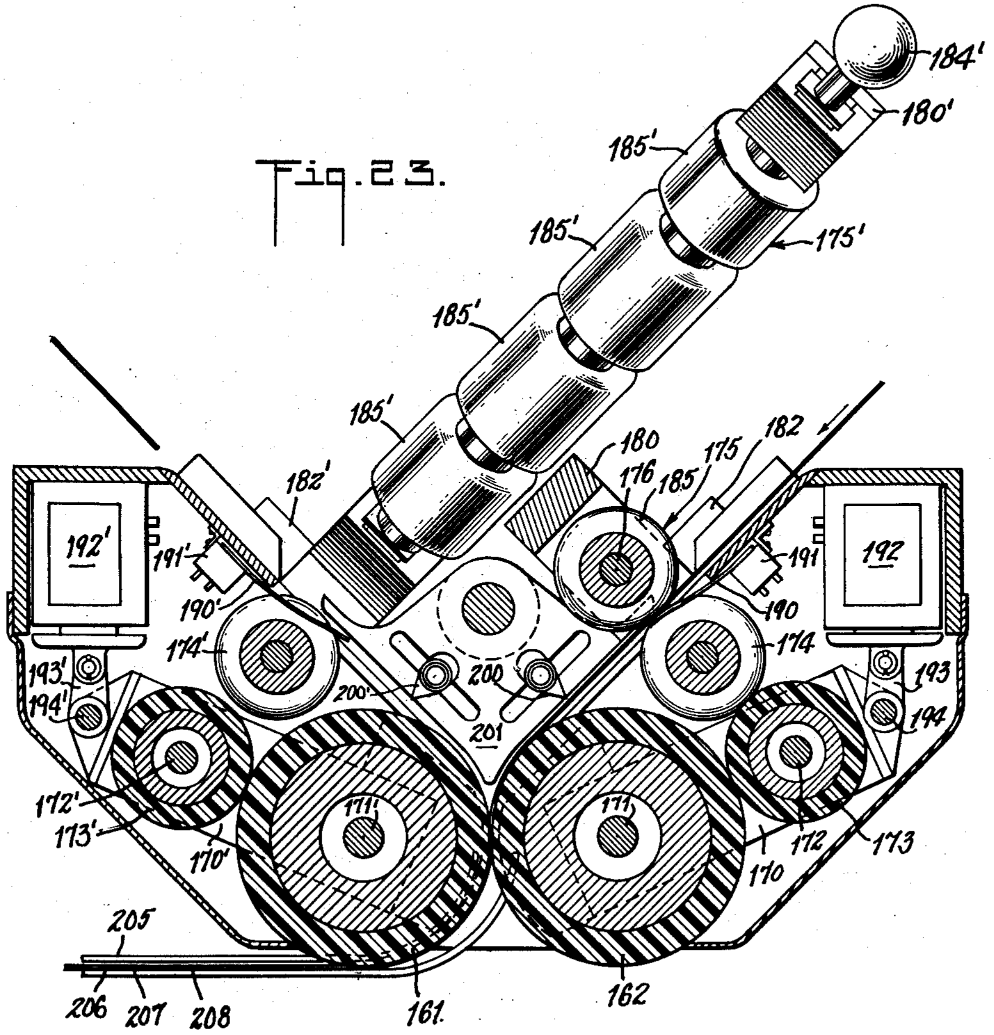
FIG. 23 is a transverse sectional elevation taken substantially on line 23—23 of FIG. 22, looking in the direction of the arrows.

Since the two sets of lead in driving connections are the same, those at the left in FIG 21 are indentified by similar reference characters to which a prime mark has been added. The operation of these lead in rolls is controlled by a feeler 190 which rests on the web and when the web has expired moved into the space between two of the rollers 185, 185. The feeler 190 operates the switch 191 which controls a solenoid 192′. The solenoid is connected by a link 193′ to a pivot 194′, which in turn extends through and actuates the lever 170′.

Thus, when the feeler 190′ enters the depression between a pair of the rolls 185′, 185′, the switch 191′ is operated to close the solenoid circuit of the solenoid 192 and lift the lever 170, thus moving the roll 173 into contact with the roll 174 and completing the driving connection to the rolls 174 and 175. Thus, the web from the right hand supply roll, not shown, will be fed by the rolls 174 and 175 to the feed rolls 161, 162, and from the feed rolls to the rolls 163, 164 to the machine on which the web is to be used.

The leading edge of the reserve web can be accurately positioned by the gauges 200 which are mounted on the frame member 201.

The feed roll 162 is mounted on the journal box 202, which is slidable and is movable toward and away from the feed roll 161. In order to facilitate threading the web between the feed rolls 161 and 162, the journal box and roll 162 can be moved away from the roll 161 by means of a hook-shaped bracket 203 controlled by an eccentric lever 204.

From the rolls 161 and 162 the webs are led through guides 205 and 206 to the rolls 163 and 164. The trailing edge of one supply roll web is shown at 207 and the leading edge of the web from the other supply roll is shown at 208.

A switch 209 is provided for connecting the solenoid circuits to the electric lead in mains.

From the foregoing description it will be evident that the embodiment of the invention illustrated in FIGS. 21 to 24 inclusive is simple in construction and efficient in operation and that the web from a supply roll can be automatically replaced by a web from a reserve supply roll whenever the web being used is exhausted. Furthermore, by reason of the driving connections described, the new web can be accurately positioned and fed so that there will be no interruption to the design or printed matter on the two webs.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What we claim is:

1. A web replacing device for use in replacing the trailing end of an exhausted web supply with the leading end of a reserve supply web comprising primary web feeding rolls, one set of controlled secondary web feeding rolls for feeding the end portion of the web of said exhausted web supply in advance of the trailing end, to said primary web feeding rolls, a second set of secondary web feeding rolls for feeding the reserve web to said primary feeding rolls, selectively operable independent driving connections between the primary feeding rolls and said secondary sets of feeding rolls, detector means associated with both sets of secondary feeding rolls and with one detector means engageable with the trailing end of the exhausted web supply, and means controlled by said last named detector means for automatically disconnecting the drive from the first set of secondary feeding rolls for the exhausted web and connecting the drive to the second set of secondary feeding rolls for the reserve supply web.

2. A web replacing device as defined in claim 1, wherein the means controlled by the detector means includes a lever.

3. A web replacing device as defined in claim 1, wherein the means controlled by the detector means includes a bell crank lever.

4. A web replacing device as defined in claim 1, wherein the drive for the secondary web feeding rolls is so related to the drive for the primary web feeding rolls that the peripheral speed of the secondary feeding rolls will be the same as the peripheral speed of the primary web feeding rolls.

5. A web replacing device as defined in claim 1, wherein the drive transmitting connections between the primary web feeding rolls and both pairs of secondary feeding rolls drives the secondary feeding rolls at the same peripheral speed as the peripheral speed of the primary web feeding rolls.

6. Web feeding means comprising a pair of primary web feeding rolls, two pairs of secondary web feeding rolls for feeding a pair of webs to said primary feeding rolls, separate detector means for detecting the exhausted end of each of said webs, independent, selective driving connections between said primary feeding rolls and said pairs of secondary feeding rolls, and means controlled by said detector means for disconnecting the drive from the primary feeding rolls to one pair of secondary feeding rolls when the web being driven by said secondary rolls is exhausted and connecting the drive from said primary feeding rolls to said other set of secondary feeding rolls.

7. Web feeding means comprising a pair of primary web feeding rolls, two pairs of secondary web feeding rolls for feeding a pair of webs to said primary feeding rolls, separate detector means for detecting the exhausted end of each of said webs, independent, selective driving connections between said primary feeding rolls and said secondary feeding rolls, and lever means controlled by said detector means for disconnecting the drive from the primary feeding rolls to one pair of secondary feeding rolls when the web being driven by said secondary rolls is exhausted and connecting the drive from said primary feeding rolls to said other set of secondary feeding rolls.

8. Web feeding means comprising a pair of primary web feeding rolls, two pairs of secondary web feeding rolls for feeding a pair of webs of said primary feeding rolls, separate detector means for detecting the exhausted end of both of said webs, selective driving connections between said primary feeding rolls and said secondary feeding rolls, and means controlled by one of said detector means for simultaneously disconnecting the drive to one pair of secondary feeding rolls when the web being driven by said secondary rolls is exhausted and connecting the drive from said primary feeding rolls.

9. Web feeding means as defined in claim 8, wherein each of said detector means is formed by interfitting and complementary parts of the feed rolls of each pair of secondary feeding rolls.

10. Web feeding means comprising a pair of primary web feeding rolls, two pairs of secondary feeding rolls arranged to selectively feed a web to said primary feeding rolls, the feeding rolls of each pair of secondary feeding rolls having spaced roll sections and the sections of one roll being spaced to fit in the spaces of the other sections, one of said rolls being movable into intermeshing relation to the other roll when the web being fed thereby is exhausted, and means interposed between the primary feeding rolls and the secondary feeding rolls set in operation by said intermeshing movement of said rolls for actuating the other pair of secondary feeding rolls to feed the other web to the primary rolls.

11. A web replacing device for use in replacing the trailing end of an exhausted web supply with the leading end of a reserve supply web comprising primary web feeding rolls, two pairs of secondary feeding rolls for selectively feeding the two webs, an intermediate drive transmitting roll driven by each primary roll and adapted to engage with one roll of the coacting pair of secondary feeding rolls, and detector means for each pair of secondary feeding rolls, and means controlled by said detector means to engage the intermediate drive transmitting roll with a roll of one pair of coacting secondary feeding rolls when the end of the web being fed by the other pair of coacting secondary feeding rolls is exhausted.

12. A web replacing device for use in replacing the trailing end of an exhausted web supply with the leading end of a reserve supply web comprising primary web feeding rolls, two pairs of secondary feeding rolls for selectively feeding the two webs, an intermediate drive transmitting roll driven by each primary roll and adapted to engage with one roll of the coacting pair of secondary feeding rolls, each intermediate roll being mounted on a lever, and detector means for each pair of secondary rolls, said detector means operating to tilt the lever and engage the intermediate drive roll with a roll of one pair of coacting secondary feeding rolls when the end of the web being fed by the other pair of secondary feeding rolls is exhausted.

13. A web replacing device for use in replacing the trailing end of an exhausted web supply with the leading end of a reserve supply web comprising primary web feeding rolls, two pairs of secondary feeding rolls for selectively feeding the two webs, an intermediate drive transmitting roll engaging each primary roll and adapted to engage with one of the pairs of coacting secondary feeding rolls, detector means for each pair of secondary rolls, and means including a solenoid controlled by said detector means to engage the intermediate drive transmitting roll with a roll of one pair of coacting secondary feeding rolls when the end of the web being fed by the other pair of coacting secondary feeding rolls is exhausted.

14. Web feeding mechanism comprising a pair of primary feeding rolls, two pairs of secondary feeding rolls adapted to selectively feed a pair of webs, an intermediate drive transmitting roll engaging each of said primary feeding rolls, one of each pair of secondary feeding rolls being selectively engageable with one of said intermediate rolls, detector means for each pair of secondary feeding rolls, and means controlled by said detector means for each pair of secondary feeding rolls for moving the intermediate drive roll into driving engagement with one roll of one of said pairs of secondary feeding rolls when the web being fed by the other pair of secondary feeding rolls is exhausted.

15. Web feeding mechanism comprising a pair of primary feeding rolls, two pairs of secondary feeding rolls adapted to selectively feed a pair of webs, an intermediate drive transmitting roll engaging each of said primary feeding rolls, one roll of each pair of secondary feeding rolls being selectively engageable with one of said intermediate rolls, detector means for each pair of secondary feeding rolls, and means controlled by said detector means including a lever for each pair of secondary feeding rolls for moving the intermediate roll into driving engagement with one roll of one of said pairs of secondary feeding rolls when the web being fed by the other pair of secondary feeding rolls is exhausted.

16. Web feeding mechanism comprising a pair of primary feeding rolls, two pairs of secondary feeding rolls adapted to selectively feed a pair of webs, an intermediate drive transmitting roll engaging each of said primary feeding rolls, one of each pair of secondary feeding rolls being selectively engageable with one of said intermediate rolls, detector means for each pair of secondary feeding rolls, and means controlled by said detector means including a bell crank lever for each pair of secondary feeding rolls for moving the intermediate roll into driving engagement with one of said pairs of secondary feeding rolls when the web being fed by the other pair of secondary feeding rolls is exhausted.

17. Web feeding mechanism comprising a pair of primary feeding rolls, two pairs of secondary feeding rolls adapted to selectively feed a pair of webs, an intermediate drive transmitting roll engaging each of said primary feeding rolls, one of each pair of secondary feeding rolls being selectively engageable with one of said intermediate rolls, said secondary feeding rolls of each pair having complementary parts that move into intermeshing relation when no web is disposed therebetween, and means for moving the intermediate roll for one pair of secondary feeding rolls into driving relation to said pair when the other pair of secondary feeding rolls moves into intermeshing relation.

18. Web feeding mechanism as defined in claim 17, in which the means for moving the intermediate roll includes a lever.

19. Web feeding mechanism as defined in claim 17, in which the means for moving the intermediate roll includes a bell crank lever.

References Cited in the file of this patent

UNITED STATES PATENTS

| | | |
|---|---|---|
| 1,540,831 | Demoos | June 9, 1925 |
| 1,550,315 | Hammer | Aug. 18, 1925 |
| 2,120,778 | Dunlap | June 14, 1938 |
| 2,160,526 | Tollison | May 30, 1939 |
| 2,167,810 | Mackley | Aug. 1, 1939 |
| 2,596,189 | Wieking | May 13, 1952 |
| 2,613,042 | Dice | Oct. 7, 1952 |
| 2,617,606 | Whatmore | Nov. 11, 1952 |
| 2,676,513 | Engstrom | Apr. 27, 1954 |
| 2,724,426 | Bell et al. | Nov. 22, 1955 |
| 2,752,984 | Casey | July 3, 1956 |
| 2,772,055 | Klingelfuss | Nov. 27, 1956 |
| 2,847,264 | Tansley | Aug. 12, 1958 |
| 2,930,664 | Liebisch | Mar. 29, 1960 |
| 2,940,507 | Butler | June 14, 1960 |
| 2,957,637 | Hosken | Oct. 25, 1960 |

UNITED STATES PATENT OFFICE

CERTIFICATE OF CORRECTION

Patent No. 3,072,354 January 8, 1963

William H. Giles et al.

It is hereby certified that error appears in the above numbered patent requiring correction and that the said Letters Patent should read as corrected below.

Column 7, line 39, for "of", second occurrence, read -- to --; line 48, after "rolls" insert -- to said other set of secondary feeding rolls --.

Signed and sealed this 10th day of December 1963.

(SEAL)
Attest:
ERNEST W. SWIDER

Attesting Officer

EDWIN L. REYNOLDS

Acting Commissioner of Patents